United States Patent
Maunula et al.

(10) Patent No.: US 8,337,793 B2
(45) Date of Patent: Dec. 25, 2012

(54) REMOVAL OF AMMONIA FROM FLUIDS

(75) Inventors: Teuvo Maunula, Oulu (FI); Matti Härkönen, Oulu (FI)

(73) Assignee: Ecocat Oy, Vihtavuori (FI)

( * ) Notice: Subject to any disclaimer, the term of this patent is extended or adjusted under 35 U.S.C. 154(b) by 0 days.

(21) Appl. No.: 12/738,697

(22) PCT Filed: Oct. 19, 2007

(86) PCT No.: PCT/FI2007/000253
§ 371 (c)(1),
(2), (4) Date: May 3, 2010

(87) PCT Pub. No.: WO2009/050323
PCT Pub. Date: Apr. 23, 2009

(65) Prior Publication Data
US 2010/0266469 A1 Oct. 21, 2010

(51) Int. Cl.
*C01G 43/08* (2006.01)
*C01C 1/00* (2006.01)
(52) U.S. Cl. .......................... 423/257; 423/352
(58) Field of Classification Search .................. None
See application file for complete search history.

(56) References Cited

U.S. PATENT DOCUMENTS

| | | | |
|---|---|---|---|
| 5,055,282 A | 10/1991 | Shikada et al. | |
| 5,746,052 A * | 5/1998 | Kinugasa et al. | 60/274 |
| 7,584,605 B2 * | 9/2009 | Beckmann et al. | 60/295 |
| 7,810,316 B2 * | 10/2010 | Salemme et al. | 60/288 |
| 2003/0161772 A1 | 8/2003 | Kikkawa et al. | |
| 2004/0023796 A1 * | 2/2004 | Nirisen et al. | 502/304 |
| 2004/0116276 A1 * | 6/2004 | Yezerets et al. | 502/34 |
| 2005/0022450 A1 * | 2/2005 | Tan et al. | 48/198.3 |
| 2005/0244320 A1 | 11/2005 | Schwefer et al. | |
| 2006/0213187 A1 * | 9/2006 | Kupe et al. | 60/286 |
| 2007/0036694 A1 * | 2/2007 | Nishioka et al. | 422/168 |

FOREIGN PATENT DOCUMENTS

| | | |
|---|---|---|
| DE | 42 04 603 | 8/1993 |
| DE | 43 14 896 | 11/1993 |
| GB | 2 167 396 | 5/1986 |
| JP | 6-165919 | 6/1994 |

OTHER PUBLICATIONS

International Search Report dated Jun. 12, 2008, from corresponding PCT application.

* cited by examiner

*Primary Examiner* — Melvin C Mayes
*Assistant Examiner* — Sheng H Davis
(74) *Attorney, Agent, or Firm* — Young & Thompson

(57) ABSTRACT

A method and equipment for removing ammonia from effluent, flue or waste fluids that include oxygen. The method includes at least the following stages: Part of the fluid (1) is conveyed to a decomposition/oxidation unit (2) and part of the fluid (1) is conveyed to a by-pass unit (3); part of the fluid (1) including ammonia is oxidized in the decomposition/oxidation unit (2) of ammonia; the fluid (1H) that was oxidized in the decomposition/oxidation unit (2) and the fluid (1) that was conveyed to the by-pass unit are mixed in a mixing unit (4) to form a fluid mixture (1S), and the fluid mixture (1S) is conveyed to a selective reduction unit (5).

23 Claims, 15 Drawing Sheets

Method for the removal of ammonia.

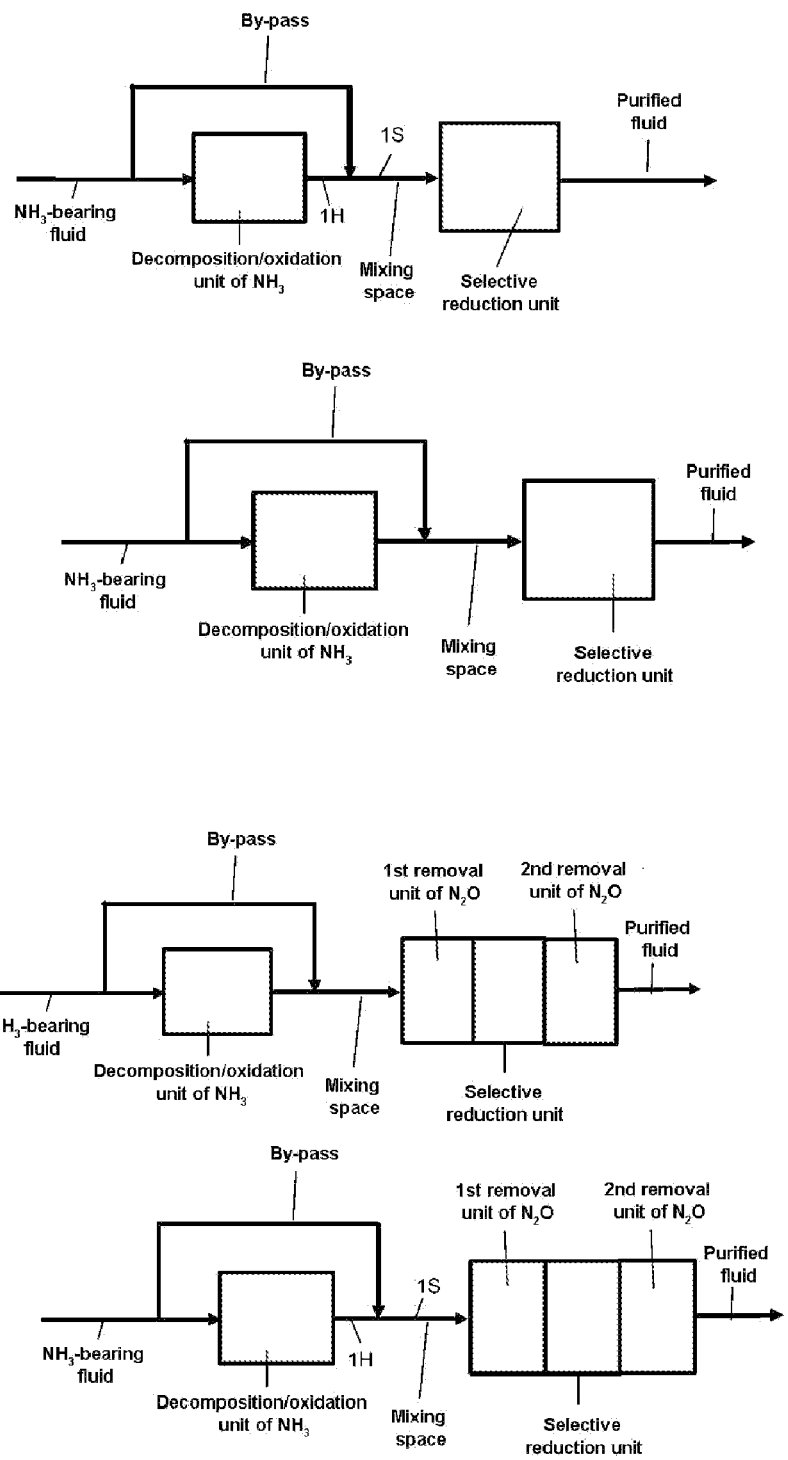
Fig. 1. Method for the removal of ammonia.

Selective reduction unit and removal unit of laughing gas as integrated into the same unit:
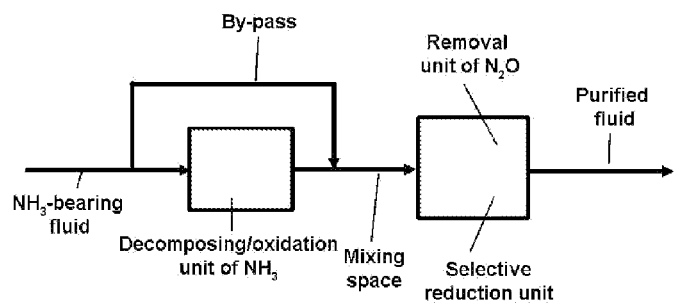
Method as implemented by catalytic units:
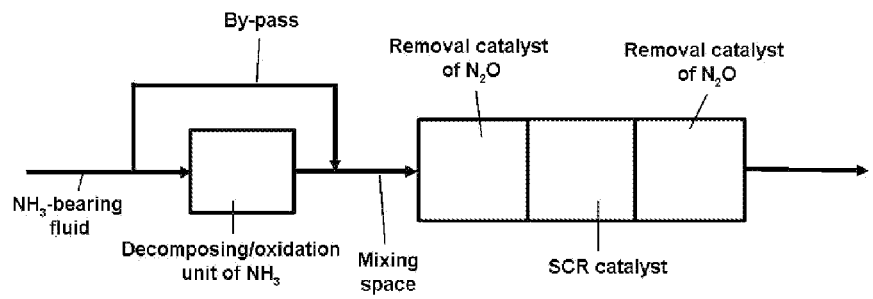
Fig. 1 cont'd. Method for the removal of ammonia.

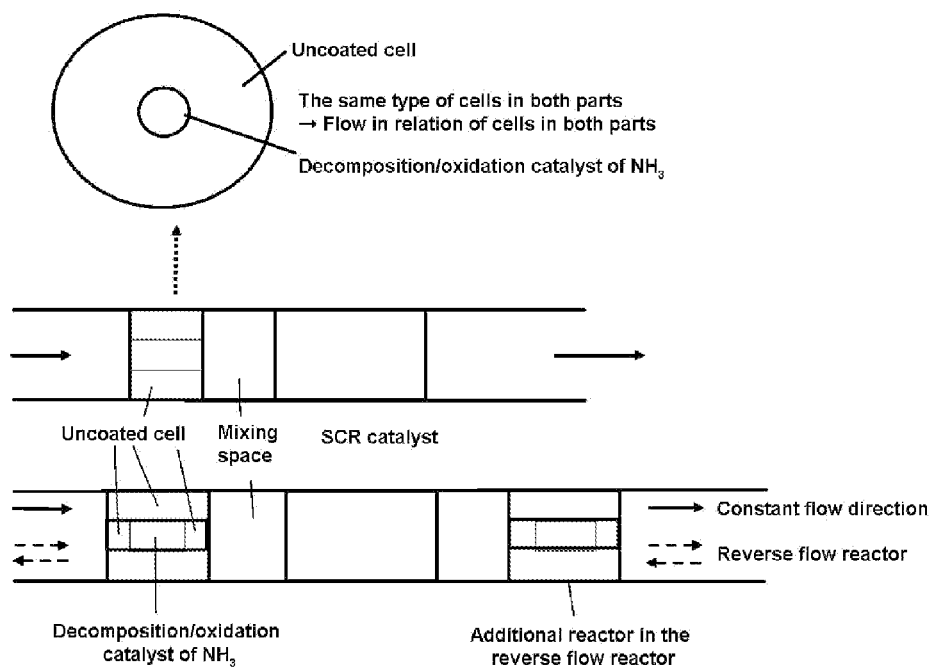
Fig. 2. Implementation of the method, using a distribution of the flow through the cell-structured by-pass in a flow-technical manner.

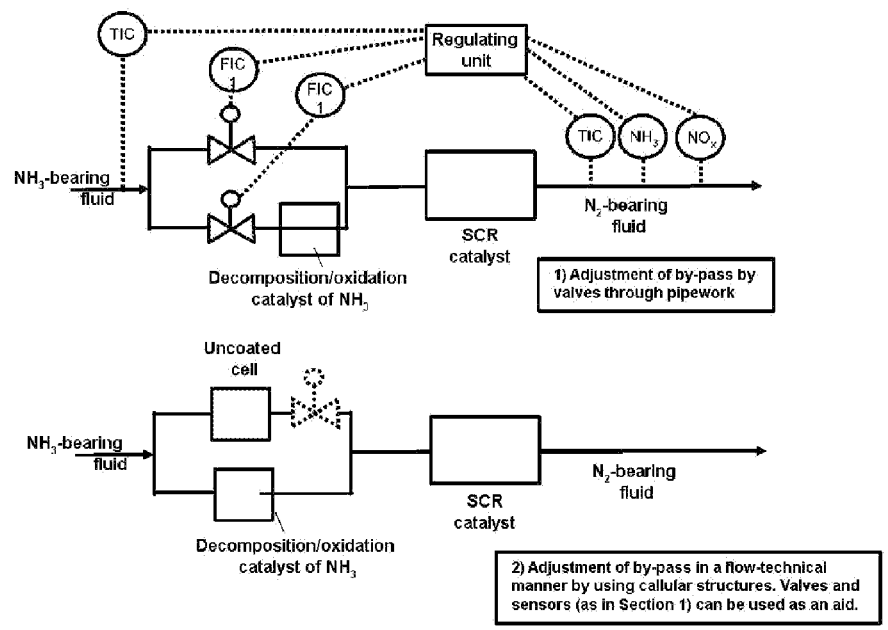
Fig. 3. Implementation of the method using valves or a flow-technical distribution of the flow to the by-pass, and a combination thereof. Adjustment using temperature, flow and content measurements, on the basis of which other process variables can be adjusted on the basis of feedback or predicted adjustments.

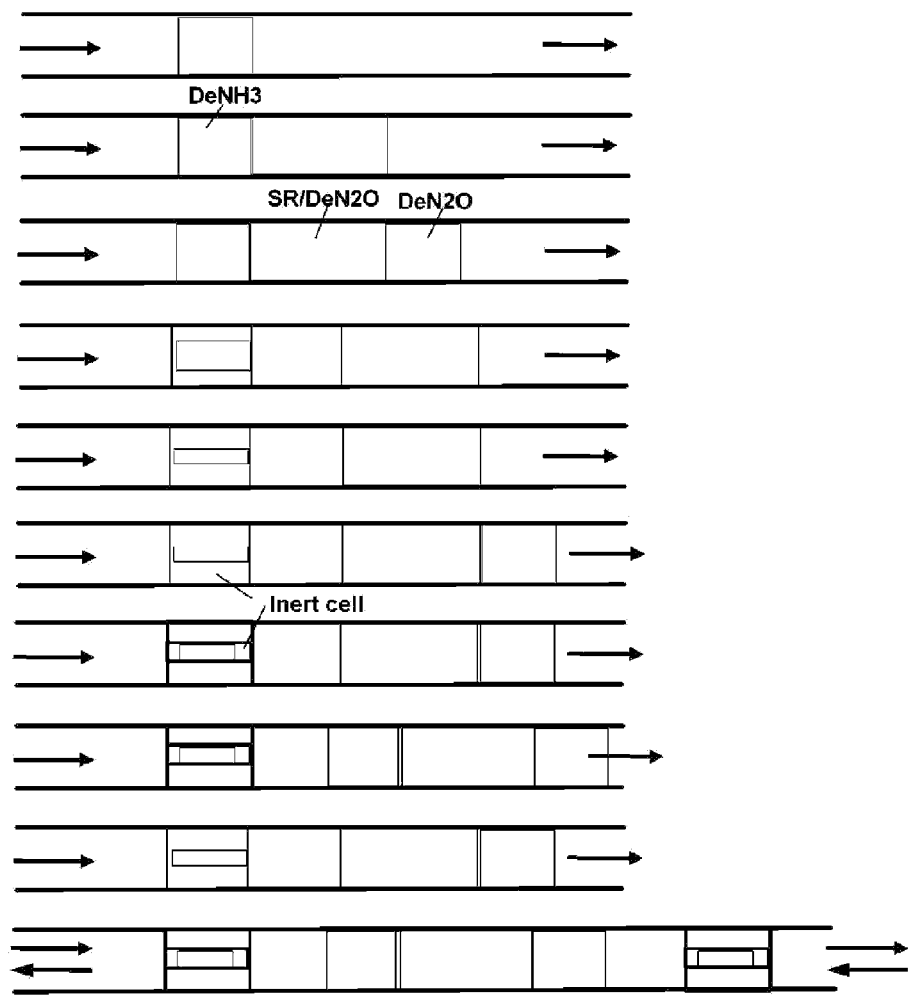
Fig. 4. Combinations used in the tests.

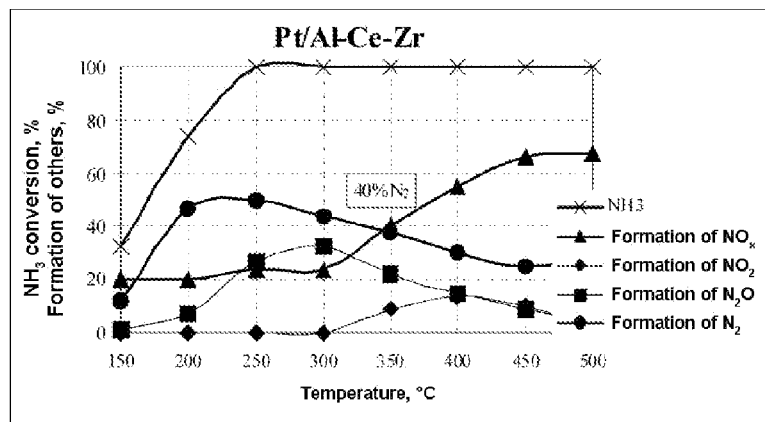
Fig. 5. Pt catalyst alone in the removal of ammonia. Mixture 1. Reference.
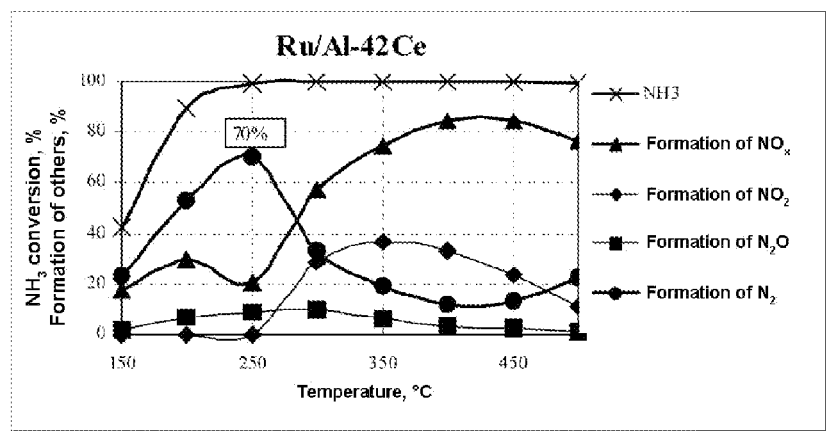
Fig. 6. Ru catalyst alone in the removal of ammonia. Mixture 1. Reference.

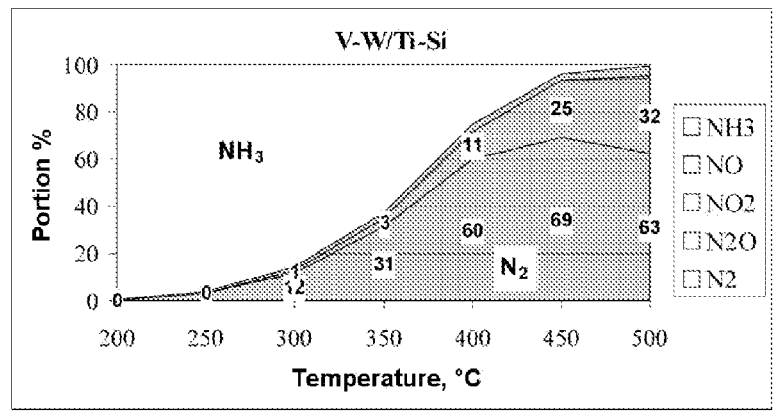
Fig. 7. V-W/Ti-Si catalyst alone in the removal of $NH_3$. Mixture 2 (25 000 $h^{-1}$).
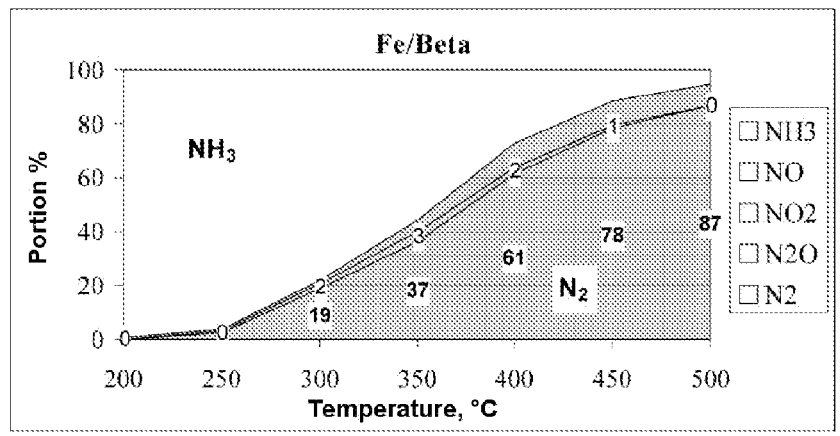
Fig. 8. Fe/Beta catalyst alone in the removal of $NH_3$. Mixture 2 (25 000 $h^{-1}$).

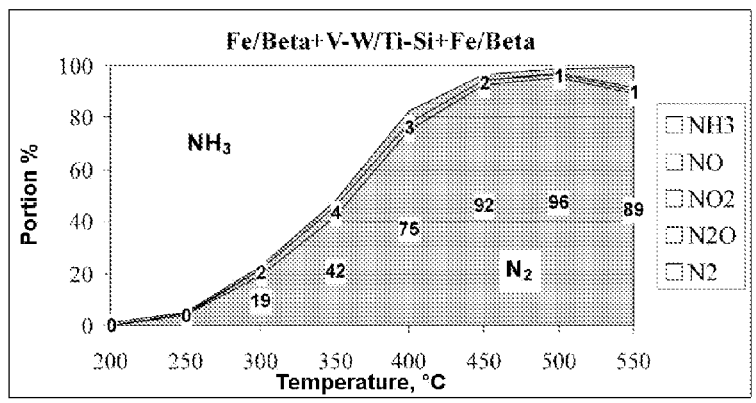
Fig. 9. Combination of Fe/Beta+V-W/Ti-Si+Fe/Beta (50 000+25 000+50 000 h$^{-1}$) in the removal of NH$_3$. Mixture 2.
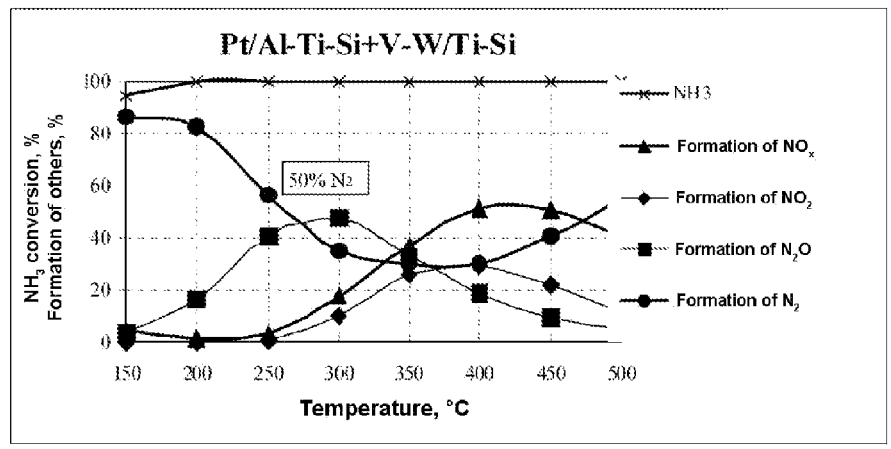
Fig. 10. Combination of Pt/Al-Ti-Si+V-W/Ti-Si (50 000+25 000 h$^{-1}$) in the removal of NH$_3$. Mixture 1.

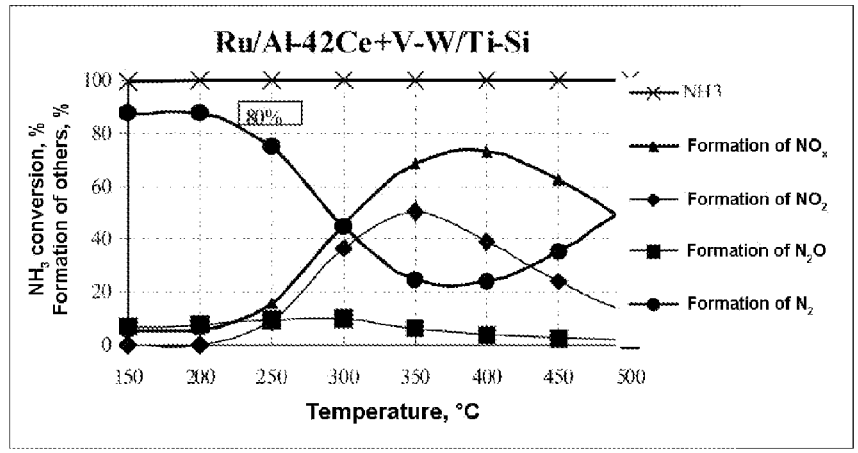
Fig. 11. Combination of Pt/Al-Ti-Si+Fe/Beta (50 000+25 000 h$^{-1}$) in the removal of NH$_3$. Mixture 1.
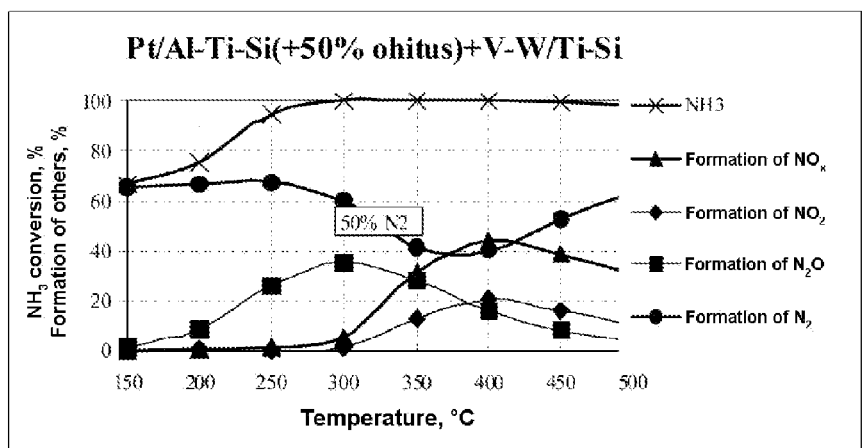
Fig. 12. Combination of Pt/Al-Ti-Si (50% through the 1st catalyst) + V-W/Ti-Si (50 000+25 000 h$^{-1}$) in the removal of NH$_3$. Mixture 1.

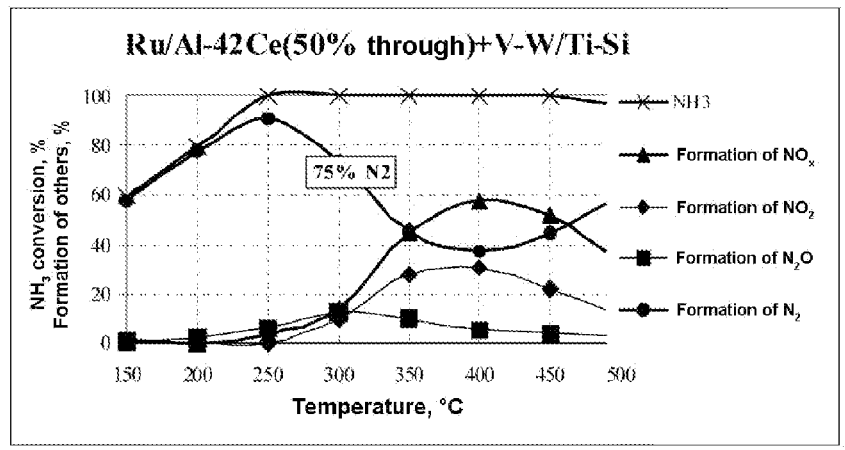
Fig. 13. Combination of Ru/Al-42Ce (50% through the 1st catalyst) + V-W/Ti-Si (50 000+25 000 h$^{-1}$) in the removal of NH$_3$. Mixture 1.
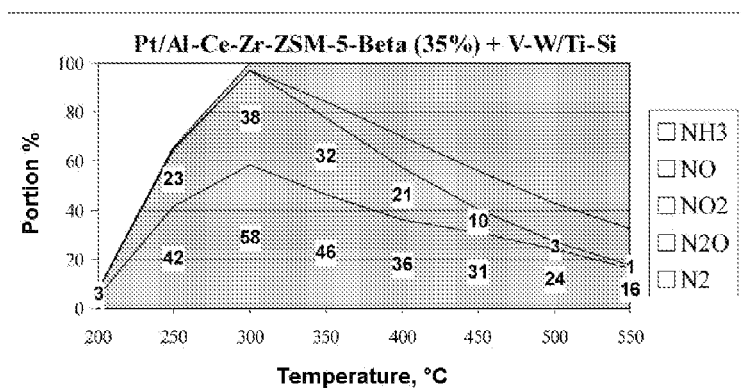
Fig. 14. Combination of Pt/Al-Ce-Zr-ZSM-5-Beta (35% through the 1st catalyst) + V-W/Ti-Si (50 000+25 000 h$^{-1}$) in the removal of NH$_3$. Mixture 2.

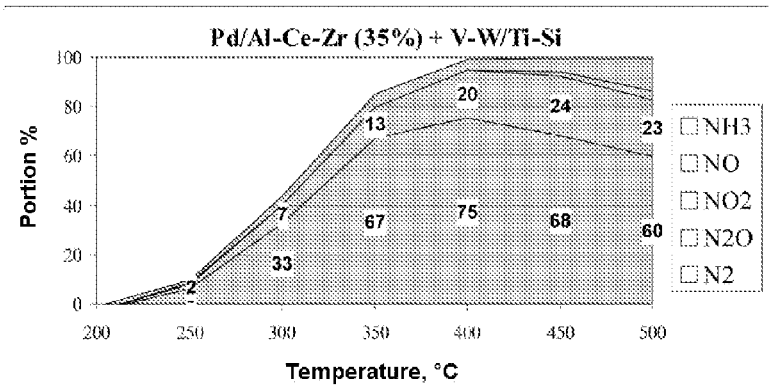
Fig. 15. Combination of Pd/Al-Ce-Zr (35% through the 1st catalyst) + V-W/Ti-Si (50 000+25 000 h$^{-1}$) in the removal of NH$_3$. Mixture 2.
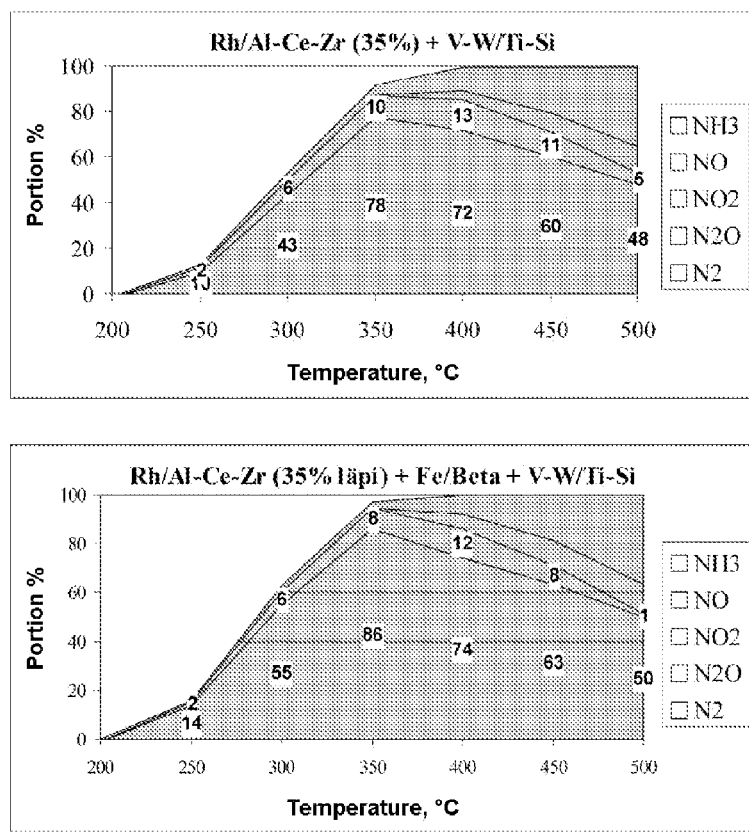
Fig. 16. Combination of Rh/Al-Ce-Zr (35% through the 1st catalyst) together with V-W/Ti-Si and Fe/Beta (50 000+25 000 h$^{-1}$ and 50 000+25 000+25.000 h$^{-1}$) in the removal of NH$_3$. Mixture 2.

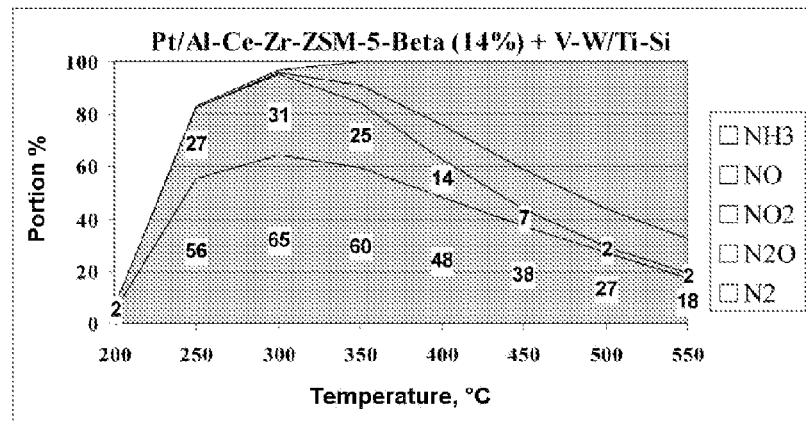
Fig. 17. Combination of Pt/Al-Ce-Zr-ZSM-5-Beta (14% through the 1st catalyst) + V-W/Ti-Si (50 000+25 000 h$^{-1}$) in the removal of NH$_3$. Mixture 2.
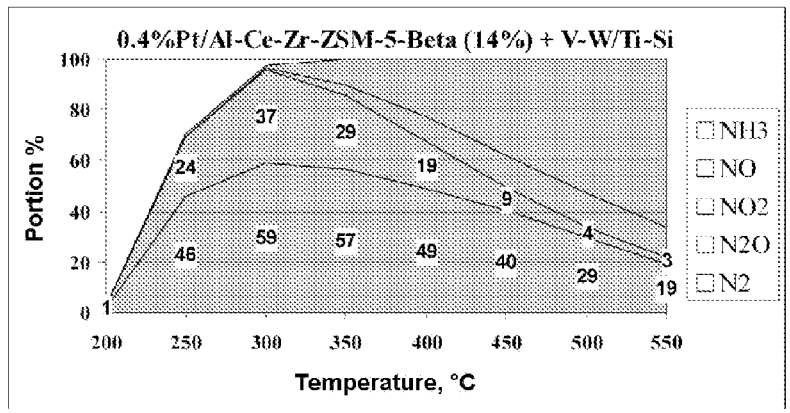
Fig. 18. Combination of 0.4%Pt/Al-Ce-Zr-ZSM-5-Beta (14% through the 1st catalyst) + V-W/Ti-Si (50 000+25 000 h$^{-1}$) in the removal of NH$_3$. Mixture 2.

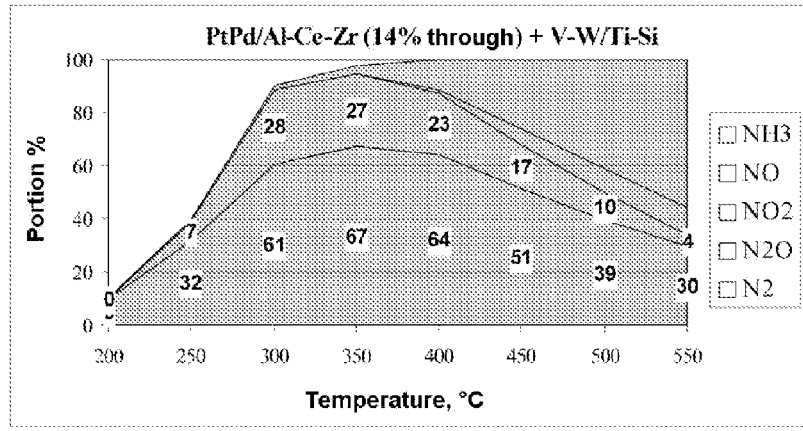
Fig. 19. Combination of PtPd/Al-Ce-Zr (14% through the 1st catalyst) + V-W/Ti-Si (50 000+25 000 h$^{-1}$) in the removal of NH$_3$. Mixture 2.
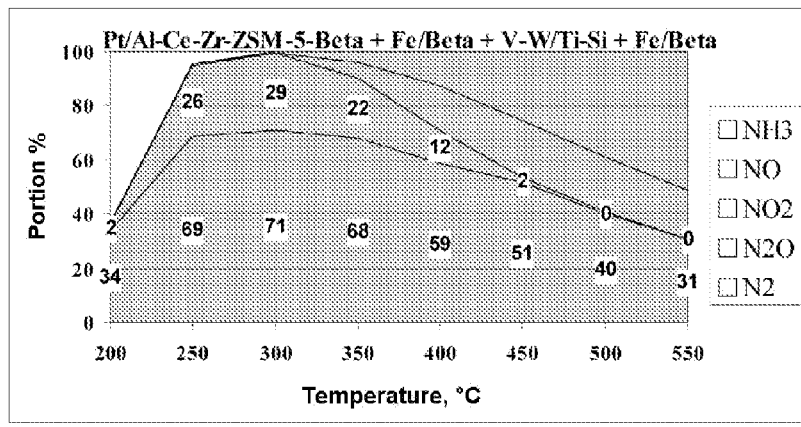
Fig. 20. Combination of Pt/Al-Ce-Zr –ZSM-5-Beta (14% through the 1st catalyst) + Fe/Beta+V-W/Ti-Si +Fe/Beta (50 000+50 000+25 000+50 000 h$^{-1}$) in the removal of NH$_3$. Mixture 2.

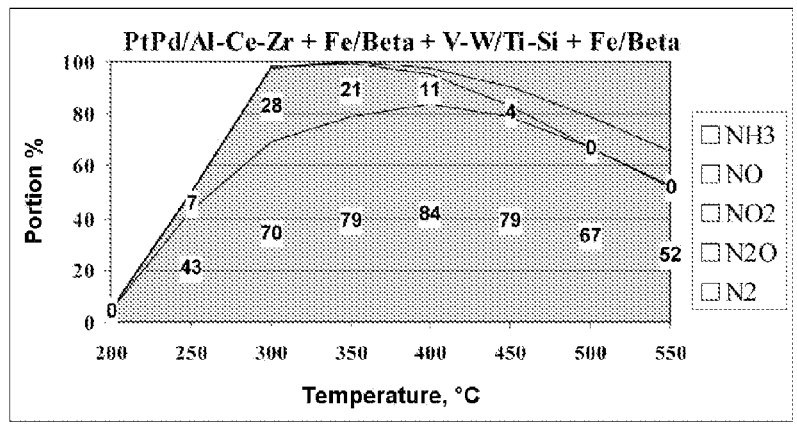
Fig. 21. Combination of PtPd/Al-Ce-Zr (14% through the 1st catalyst) + Fe/Beta+V-W/Ti-Si +Fe/Beta (50 000+50 000+25 000+50 000 h$^{-1}$) in the removal of $NH_3$. Mixture 2.
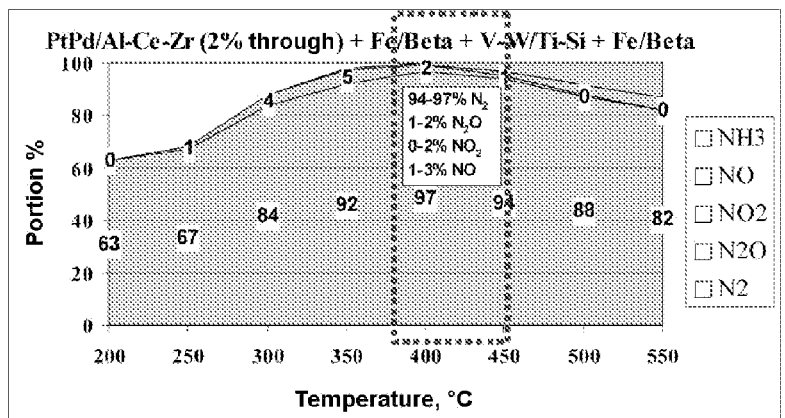
Fig. 22. Combination of PtPd/Al-Ce-Zr (2% through the 1st catalyst) + Fe/Beta+V-W/Ti-Si +Fe/Beta (50 000+50 000+25 000+50 000 h$^{-1}$) in the removal of $NH_3$. Mixture 2.

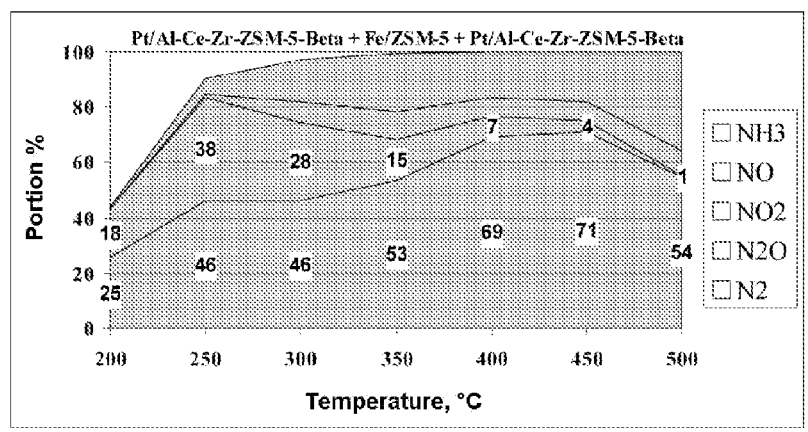
Fig. 23. Combination of Pt/Al-Ce-Zr-ZSM-5-Beta (15% through the 1st catalyst) + Fe/ZSM-5 + Pt/Al-Ce-Zr-ZSM-5-Beta (35% through) (50 000+25 000+50 000 h$^{-1}$) in the removal of NH$_3$. Mixture 2.

REMOVAL OF AMMONIA FROM FLUIDS

FIELD OF THE INVENTION

The object of the invention is a method and equipment for the removal of ammonia from oxygen-comprising fluids, such as effluent, flue or waste fluids. Another object of the invention is equipment suitable to this method.

BACKGROUND OF THE INVENTION

Ammonia ($NH_3$) can be generated in various conditions or it is used as a reactant in some processes. Ammonia that has escaped into the air or the surface waters is harmful to humans and the environment; therefore, it is not allowed to escape in considerable amounts along with effluent gases from the processes. The authorities have set the highest allowable contents or total emission amounts for ammonia emissions. Ammonia is also used for the adjustment of pH in solutions. The effluent gases of processes may comprise small or large amounts of ammonia. Urea- or $NH_3$-SCR is a common removal method of nitrogen oxides, which can release small amounts of ammonia. Ammonia is also generated from nitrogen compounds in low-oxygen conditions, such as stoichiometric or rich combustion mixtures, where the fuels are solid, liquid or gaseous. Ammonia can be generated in fuel refining. Ammonia can be generated, for example, when purifying soil, other solid materials or liquids that comprise ammonia as a chemical or derivatives of ammonia, or it can be generated naturally in low-oxygen conditions. In agriculture, large amounts of ammonia emissions are generated. When gasifying fuels, ammonia can also be generated together with HCN from the nitrogen contained in the fuel.

For the removal of ammonia from gases or liquids, catalytic decomposition, adsorption, absorption or thermal decomposition methods have been used. In reductive conditions, $NH_3$ decomposes or reacts thermally or catalytically, forming mainly nitrogen ($N_2$) and small amounts of laughing gas ($N_2O$). In mixtures comprising excess amounts of oxygen, $NH_3$ can form nitrogen oxides (NO, $NO_2$, $N_2O$) in the thermal or catalytic methods, and the selectivity to nitrogen is a critical factor. The formation of laughing gas is also higher than in reductive or stoichiometric conditions.

In the catalytic decomposition of ammonia, two different operating conditions can definitely be distinguished, i.e., decomposition in a rich mixture (low amounts of oxygen) or a lean mixture (excessive amounts of oxygen). When there are excessive amounts of oxygen, the main reaction is often that of $NH_3$ into nitrogen oxides, and the selectivity to nitrogen is a problem. When there are low amounts of oxygen, nitrogen oxides are not easily generated but the oxygen required must be obtained selectively before carbon monoxide, hydrocarbons or hydrogen, and the oxygen supply is limited. The decomposition of $NH_3$ at high temperatures and pressures is thermodynamically limited. Ammonia has been decomposed by alumina-based Ni, Ru catalysts (Mojtahedi et al., Fuel Proc. Tech. 45 (1995) 221). For the removal of nitrogen compounds from gasifying gases, a mixture formed by the oxide of the metals (such as Fe oxide) of the fourth cycle of the group VIII of the periodic system and alkali metal or alkali earth metal carbonate or oxide (such as CaO) (FI 904697, Leppälahti and Simell) have been used. Generally, Mo, W, Re, Fe, Co, Rh, Ni, Pt, Cu and V (Catal. Sci. Tech.1 (1981) 118, or U.S. Pat. No. 5,055,282) have been mentioned to be the chemical elements that are suitable to the decomposition of NH3 in the catalyst. It has been observed that Ru/alumina decomposes NH3 at a temperature of as low as 500° C. (U.S. Pat. No. 5,055,282). The Ru/alumina catalyst may also have included various alkali metals and alkali earth metals (K, Li, Na, Cs, Ca, Ba, Mg). The decomposition of ammonia has also been exploited in the industrial processing of steel products.

Selective catalytic oxidation (SCO) refers to a method, wherein $NH_3$ is selectively oxidized into nitrogen ($N_2$) with oxygen. This method relates to a phased air supply in combustion or by gasifying, wherein the oxidation of $NH_3$ into $NO_x$ can be prevented. There are difficulties in preventing the formation of $NO_x$ and the integration of the method into the combustion/gasifying process in question. The catalysts used included $MoO_3$, $V_2O_5$, $Bi_2O_3$, and PbO, $MoO_3/SiO_2$ catalysts (Boer et al. Stud. Surf. Sci. Catal. 72 (1992) 133). The poor activity, selectivity or durability of the catalysts are typical problems, especially, when the operating temperatures are normally high (>400° C.).

SUMMARY OF THE INVENTION

The purpose of the invention is to provide a catalytic method and equipment for objects comprising ammonia, which can be used to selectively remove $NH_3$ from fluids into nitrogen. The method and the equipment are suitable for the treatment of effluent, flue, and waste fluids, in particular.

The invention is based on the fact that an $NH_3$-bearing fluid mixture is conveyed through two functional units, where the $NH_3$ effluents can be converted into nitrogen at a high selectivity. First, $NH_3$ is decomposed into nitrogen and partly converted catalytically or thermally into nitrogen oxides NO and $NO_2$ in the oxidation/decomposition unit of $NH_3$, through which all of the fluid goes, or part of the fluid can bypass this unit through a by-pass. After the by-pass, these fluid streams combine and are allowed to mix together in a mixing space, where the fluids comprising $NH_3$ and nitrogen oxides mix well with each other. The mixture thus obtained is conveyed to a selective reduction unit, where $NH_3$ and the nitrogen oxides react with each other catalytically or thermally, mainly forming selectively nitrogen $N_2$, which is the main component of the fluid coming out. In the oxidation/decomposition unit of $NH_3$, there can be one or more oxidation catalysts of NO or $NH_3$ or decomposition catalysts of $NH_3$, and in the selective reduction unit, one or more SCR catalysts, which catalysts can have the same or different compositions. Before and after the SCR unit, there can also be a removal unit of laughing gas, where the laughing gas that is forming or going in is decomposed or reduced into nitrogen. The removal unit of laughing gas can also be situated immediately after the oxidation/decomposition unit of $NH_3$ before the by-pass joins the mixture.

The method according to the invention comprises at least the following stages:
  part of the fluid is conveyed to the decomposition/oxidation unit and part of the fluid is conveyed to the by-pass unit,
  part of the fluid comprising ammonia is oxidized in the decomposition/oxidation unit of ammonia,
  the fluid that was oxidized in the decomposition/oxidation unit and the fluid that was conveyed to the by-pass unit are mixed in the mixing unit to form a fluid mixture, and the fluid mixture is conveyed to the selective reduction unit.

Correspondingly, the equipment comprises at least the following parts:
  a decomposition/oxidation unit for decomposing and oxidizing the ammonia in the fluid,
  a by-pass unit for conveying the fluid past the decomposition/oxidation unit, a mixing unit for mixing the fluid that was oxidized in the decomposition/oxidation unit and the fluid that was conveyed to the by-pass unit to form a fluid mixture, and a reduction unit for the selective reducing of the fluid mixture.

By means of the method according to the invention, it is possible to selectively convert ammonia into nitrogen that is harmless in a wide temperature range, and the amounts of harmful nitrogen oxides (NO, $NO_2$, $N_2O$) remain very low. In known methods, the operational windows are narrow regarding the temperature and the contents, and nitrogen oxides are usually generated therein as by-products. In the decomposition/oxidation unit of $NH_3$, it is possible to decompose part of the ammonia into nitrogen and to oxidize part of it into $NO/NO_2$. The by-pass makes it possible to adjust the ratio of $NH_3/NO_x$ before the reduction unit so that the mixture reacts selectively, forming nitrogen. The mixing units are needed to mix the two fluid flows together.

According to an object of the invention, the fluid mixture is conveyed to the removal unit of laughing gas. This provides the advantage that the laughing gas that was generated in the previous units can be removed. Usually, the formation of laughing gas is a problem in the ammonia removal methods.

According to an object of the invention, the ammonia of the fluid mixture is selectively converted into nitrogen $N_2$ in the selective reduction unit. The method according to the invention is first used to create a suitable mixture, which in the reduction unit reacts, forming nitrogen.

According to an object of the invention, the functional units (the decomposition/oxidation unit of $NH_3$, the reduction unit and/or the removal unit of laughing gas) function thermally or catalytically or by means of a combination thereof. The same idea can be applied both to thermal and catalytic reactions. According to an object of the invention, the decomposition/oxidation unit of ammonia, the selective reduction unit, and/or the removal unit of laughing gas function catalytically and they are coated on the surfaces of cell structures that comprise straight, parallel, divergent and/or winding flow channels, the structures being made of ceramic, metallic or catalytic materials.

According to an object of the invention, the method comprises a selective reduction unit and a removal unit of laughing gas, which are integrated into the same unit. The method is rendered simpler by integrating the two units together, if possible in the operating conditions. Even if the units were integrated into one, either one of them can also be a separate unit. Some catalysts are capable of functioning effectively in both reactions, whereby the integration is possible.

According to an object of the invention, the portion of the by-pass from the total fluid flow is 1 to 99.9%, preferably 60 to 99%. In order to make the method work, a by-pass is needed, the extent of which can vary according to the circumstances. With the invention, it was observed that it is preferable that the by-pass is larger than the volume of flow going to the decomposition/oxidation unit of $NH_3$.

According to an object of the invention, there are one or more flow regulators and/or uncoated cells in the by-pass unit. The flow regulators can be used to regulate the extent of the by-pass according to the operating conditions, and to use, for example, for feedback coupling to regulate from the concentrations after the reactor. The uncoated cell gives the advantage that the flow can be controlled without separate regulating units. The by-pass can also comprise an empty flow channel with its size selected so that the extent of the by-pass is suitable. By using, in the by-pass, a cell similar to that of the decomposition/oxidation unit, the flow distribution remains the same at different temperatures. If the flow channels were different, their temperature dependences would be different and, thus, the flow distribution would change to some extent as a function of temperature.

According to an object of the invention, in the mixing unit, a fluid mixture comprising ammonia and nitrogen oxides is prepared from the fluid that comprises ammonia. It is essential to mix the two fluids together before conveying them to the reduction unit.

According to an object of the invention, the by-pass is adjusted so that the ratio of $NH_3/NO_x$ contents in the mixing unit is within 0.1 and 10, preferably within 0.8 and 1.6. The optimal mixing ratio depends on the circumstances. In catalytic objects, the mixing ratio value can be near 1, but in thermal applications, in particular, the ratio can be high.

According to an object of the invention, the method operates with a parallel or reverse flow or a combination thereof. The method can be implemented as sequential units or as a system that utilizes the reaction heats by means of the reverse flow. It is also possible to use a system, wherein the flow is recycled through part of the units only, e.g., the removal unit of laughing gas can be reversed after the flow system, functioning on the principle of flow-through. In this way, energy is recycled in the reaction, where the most heat is generated, but there is no need to place two removal units of laughing gas in the reverse flow reactor. The method is well-suited to the reverse flow reactor, as the reduction unit can be in the middle and no two units are needed, and on both sides thereof, there are decomposition/oxidation units of $NH_3$. A considerable advantage is also to use two identical units on both sides of the reduction unit in the reverse flow reactor. In the reverse flow reactor, there can also be conventional heat transfer structures, which are also placed identically on both sides of the other units.

According to an object of the invention, oxygen or a substance comprising oxygen is fed into the fluid and/or the fluid mixture before the decomposition/oxidation unit of $NH_3$ and/or before the selective reduction unit and/or before the removal unit of laughing gas. By feeding the substance comprising oxygen (such as oxygen, air, ozone, hydrogen peroxide), part of the ammonia can be made to oxidize into nitrogen oxides, whereby an $NH_3/NO_x$ mixture can be formed. This is advantageous in objects that otherwise do not comprise sufficient amounts of oxygen for the reactions. In some applications, the flue or process gas does not comprise enough oxygen. These objects include gasifying gases, gases releasing/being removed from air-tight sources (such as soil, water). The substance comprising oxygen can be fed directly to the fluid going to the decomposition/oxidation unit of $NH_3$ only, whereby an especially oxygen-rich mixture is obtained in the unit, promoting the oxidation reaction, in particular.

According to an object of the invention, a reducing agent, such as ammonia and/or a derivative of ammonia and/or hydrocarbon or hydrocarbon derivatives are fed into the fluid and/or the fluid mixture before the decomposition/oxidation unit of $NH_3$ and/or before the selective reduction unit and/or before the removal unit of laughing gas. This is an additional advantage, which can be used in some circumstances, if there is no other way to provide a suitable mixture in the reduction unit. This can also be an accessory, which is used in certain conditions only, when no suitable mixture is obtained (a too low $NH_3/NO_x$ ratio) by means of the flow technology or valves. An extra feeding can also be used for quick adjustments from feedback measurements. By adding hydrocarbon, the temperature of the system can be increased as desired. $NH_3$ can also comprise the same fluid that is to be treated, which has been stored and which is fed for this adjustment, when needed.

According to an object of the invention, the method includes a decomposition/oxidation unit of $NH_3$, a selective reduction unit and a removal unit of laughing gas, which are integrated into the same unit and structure. The simplest solution of the method is to integrate these units into the same structure. In that case, the by-pass is reaction-technical, while part of $NH_3$ does not react in the flow or catalyst channel. In a catalytic application, the integrated system can comprise a combination of various catalysts. For example, the catalyst may include the said decomposition/oxidation and reduction catalysts of $NH_3$. As the $NH_3/NO_x$ ratio does not easily remain within a suitable range, a problem with this solution is its narrow temperature window.

According to an object of the invention, the decomposition/oxidation unit of $NH_3$ comprises a catalyst that comprises Pt, Pd, Ru or Rh or a combination thereof, and the extent of the by-pass is >70%. This solution provided high activities and selectivities in the examples.

According to an object of the invention, the method comprises a selective reduction unit and a removal unit of laughing gas, which comprise a catalyst that comprises vanadium, wolfram, copper and/or iron, or a combination thereof. Using these active metals, good results were obtained in the method.

According to an object of the invention, the method comprises a decomposition/oxidation unit of $NH_3$ and/or a selective reduction unit and/or a removal unit of laughing gas, which comprise zeolite, silicon dioxide, aluminium oxide and/or titanium oxide. Using these support materials, good results were obtained with the method according to the invention.

According to an object of the invention, the method comprises one or more heat transfer stages. Heat exchange is needed to trigger and maintain the reaction. The reaction heats can be recycled and the reaction started by extra energy, such as fuel feedings.

According to an object of the invention, the decomposition/oxidation catalyst of $NH_3$ comprises noble metals, such as Pt, Pd, Rh, Ru, Ag, Ir, Au, base metals, such as Sc, Y, Zr, V, Mn, Cr, Fe, Ni, Co, Zn, Ge, Ga, In, Sn, Ce, or the mixtures or mixed oxides thereof as such or on the surface of a carrier. These metals have activity in this reaction.

According to an object of the invention, the reduction unit comprises catalytic material, which comprises base metals Zr, V, Mn, Cr, Fe, Ni, Cu, Co, Ce, W, Hf, Nb, Mo, or the mixtures/mixed oxides thereof as such or on the surface of a carrier. These metals have activity in this reaction.

According to an object of the invention, the equipment comprises a removal unit of laughing gas, which comprises catalytic material that comprises noble metals Pt, Pd, Rh, Ru, Ag, Ir, Au, preferably Pt, Pd or Ru, or base metals Y, Zr, Mn, Cr, Fe, Ni, Co, or the mixtures/mixed oxides thereof as such or on the surface of a carrier. These metals have activity in this reaction.

According to an object of the invention, the equipment comprises, in the decomposition/oxidation catalyst, the reduction unit and/or the removal unit of laughing gas, a carrier (a support material), which comprises aluminium oxide, aluminium silicate, such as zeolites, titanium oxide, silicon dioxide, zirconium oxide, silicon oxide, or mixtures or mixed oxides thereof. The purpose of the carrier is to stabilize the active metals over a large surface area. The carriers used in the tests are named in the examples.

According to an object of the invention, the equipment comprises zeolite, which is selected from a group consisting of ZSM-5, ZSM-22, Beta, Y, mordenite, ferrierite, TS-1 zeolites or a mixture thereof. The zeolites have high surface areas and special pore structures/sizes and acidities, all of which can be utilized in the catalysts of the method.

BRIEF DESCRIPTION OF THE DRAWINGS

Some of embodiments of the invention are described below in detail by making reference to enclosed drawings.

FIG. 1 shows Method for the removal of ammonia.

FIG. 2 shows Implementation of the method, using a distribution of the flow through the cell-structured by-pass in a flow-technical manner.

FIG. 3 shows Implementation of the method using valves or a flow-technical distribution of the flow to the by-pass, and a combination thereof. Adjustment using temperature, flow and content measurements, on the basis of which other process variables can be adjusted on the basis of feedback or predicted adjustments.

FIG. 4 shows Combinations used in the tests.

FIG. 5 shows Pt catalyst alone in the removal of ammonia.

FIG. 6 shows Ru catalyst alone in the removal of ammonia.

FIG. 7 shows V-W/Ti-Si catalyst alone in the removal of $NH_3$.

FIG. 8 shows Fe/Beta catalyst alone in the removal of $NH_3$.

FIG. 9 shows Combination of Fe/Beta+V-W/Ti-Si+Fe/Beta (50 000+25 000+50 000 $h^{-1}$) in the removal of $NH_3$.

FIG. 10 shows Combination of Pt/Al-Ti-Si+V-W/Ti-Si (50 000+25 000 $h^{-1}$) in the removal of $NH_3$.

FIG. 11 shows Combination of Pt/Al-Ti-Si+Fe/Beta (50 000+25 000 $h^{-1}$) in the removal of $NH_3$.

FIG. 12 shows Combination of Pt/Al-Ti-Si (50% through the 1st catalyst) + V-W/Ti-Si (50 000+25 000 $h^{-1}$) in the removal of $NH_3$.

FIG. 13 shows Combination of Ru/Al-42Ce (50% through the 1st catalyst) + V-W/Ti-Si (50 000+25 000 $h^{-1}$) in the removal of $NH_3$.

FIG. 14 shows Combination of Pt/Al-Ce-Zr-ZSM-5-Beta (35% through the 1st catalyst) + V-W/Ti-Si (50 000+25 000 $h^{-1}$) in the removal of $NH_3$.

FIG. 15 shows Combination of Pd/Al-Ce-Zr (35% through the 1st catalyst) + V-W/Ti-Si (50 000+25 000 $h^{-1}$) in the removal of $NH_3$.

FIG. 16 shows Combination of Rh/Al-Ce-Zr (35% through the 1st catalyst) together with V-W/Ti-Si and Fe/Beta (50 000+25 000 $h^{-1}$ and 50 000+25 000+25.000 $h^{-1}$) in the removal of $NH_3$.

FIG. 17 shows Combination of Pt/Al-Ce-Zr-ZSM-5-Beta (14% through the $1^{st}$ catalyst) + V-W/Ti-Si (50 000+25 000 $h^{-1}$) in the removal of $NH_3$.

FIG. 18 shows Combination of 0.4%Pt/Al-Ce-Zr-ZSM-5-Beta (14% through the 1st catalyst) + V-W/Ti-Si (50 000+25 000 $h^{-1}$) in the removal of $NH_3$.

FIG. 19 shows Combination of PtPd/Al-Ce-Zr (14% through the 1st catalyst) + V-W/Ti-Si (50 000+25 000 $h^{-1}$) in the removal of $NH_3$.

FIG. 20 shows Combination of Pt/Al-Ce-Zr-ZSM-5-Beta (14% through the 1st catalyst) + Fe/Beta+V-W/Ti-Si +Fe/Beta (50 000+50 000+25 000+50 000 $h^{-1}$) in the removal of $NH_3$.

FIG. 21 shows Combination of PtPd/Al-Ce-Zr (14% through the 1st catalyst) + Fe/Beta+V-W/Ti-Si +Fe/Beta (50 000+50 000+25 000+50 000 $h^{-1}$) in the removal of $NH_3$.

FIG. 22 shows Combination of PtPd/Al-Ce-Zr (2% through the 1st catalyst) +Fe/Beta+V-W/Ti-Si +Fe/Beta (50 000+50 000+25 000+50 000 $h^{-1}$) in the removal of $NH_3$.

FIG. 23 shows Combination of Pt/Al-Ce-Zr-ZSM-5-Beta (15% through the 1st catalyst) + Fe/ZSM-5 + Pt/Al-Ce-Zr-ZSM-5-Beta (35% through) (50 000+25 000+50 000 h$^{-1}$) in the removal of $NH_3$.

DETAILED DESCRIPTION OF THE INVENTION

FIG. 1 shows the method according to the invention, comprising the functional units in their general forms or using catalytic units. Accordingly, the units can also function thermally in combustion plants, for example. The by-pass can also be integrated into the decomposition/oxidation unit of $NH_3$, whereby the by-pass is a result of the fact that part of $NH_3$ has not reacted (FIG. 2). Part of the ammonia does not react, when the coating is omitted from part of the cell in the radial direction. There can also be some uncoated cell at both ends of the decomposition/oxidation catalyst of $NH_3$ to prevent the reactions at the ends of the cells. Flow-technically, the fluid can also be distributed through various parts by using effluent splitters (plates, throttlings and/or valves) or by covering part of the face surface of either the catalyst or the inert cell. This fine adjustment can be used, if the planned flow distribution, which is implemented by the cell structures, is not suitable and too much ammonia or, alternatively, nitrogen oxides come to the selective reduction unit. The mixing interval is essential to allow the fluids, which have passed through the catalyst and the inert layer, to mix together and to obtain the desired mixture for the next unit.

The by-pass and the flow control through the various units can also be implemented by means of flow controllers and feedback from temperature, ammonia and $NO_x$ measurements (FIG. 3). The control valves always enable the desired flow distribution through the various units, for example, on the basis of the temperature or the contents. The uncoated unit can also be a completely separate structure, whereby there is no risk of reactions on the face surfaces (FIG. 3). In this solution, the control valve can be provided for extra adjustment.

The systems according to the invention can be built in different ways according to the object and goals (FIG. 4). Thus, the method can comprise the decomposition/oxidation unit of $NH_3$, which can be partly bypassed and, after that, there are the selective reduction unit and/or the decomposition/reduction unit of $N_2O$ in the direction of flow.

In the reverse flow reactor, the system can comprise a decomposition/oxidation unit of $NH_3$ on both sides of the reduction unit and/or the $N_2O$ unit (FIG. 4). The reverse flow reactor can also comprise conventional heat exchangers on both sides of the catalyst units. The reverse flow reactor can be used to exploit the reaction heat, and the reactor operates without extra heating with a relatively small amount of emissions, the reactions of Which result in larger amounts of reaction heat than energy loss. The heat exchangers employ conventional cellular heat exchanger structures, which endure the operating conditions. In particular, the cell structures can be made of metal foil and the form of cells consists of straight and creased foil or two creased cell structures. The material of the heat exchanger is good in conducting heat and it endures the operating conditions. Typical materials comprise various metal plates and foils comprising, among others, iron, chrome, aluminium, nickel, copper and/or cobalt. The heat exchanger can also be coated. The method can also employ combinations of one or more reverse flow reactors and normal tube reactors with one flow direction, whereby the removal unit of laughing gas can be placed after the reverse flow reactor, for example. The combination of several reverse flow reactors can be used to maintain different temperatures in the different reactors, and thus to optimize the operational windows and the energy balances of the system. A combination of several reactors, which have deviating operation modes or conditions, can also be used in objects, where hydrocarbons and their derivatives are to be removed simultaneously with ammonia, for example. Extra heat can be provided by electric or burner heating or fuel feeding. The oxidation/decomposition catalyst of $NH_3$ also works as an effective combustion catalyst, which can be used to increase the temperature of the system, if a small amount of burning fuel is fed to the fluid. One or more units can be heated or cooled externally. Other additives (oxygen-comprising or reducing compounds) or extra energy (e.g., plasma for the oxidation) can also be used in the units to improve the oxidation and reduction reactions.

In the method, a reactant ($NH_3$, $NO_x$, $N_2O$, HCs, oxygen) can also be fed to the pipework, for example, in situations, where the required conditions cannot be provided otherwise. Oxygen can be fed to the effluent gases in mixtures that comprise very low amounts of oxygen to oxidize $NH_3$ in the decomposition/oxidation unit of $NH_3$. The oxidation of $NH_3$ can be implemented by feeding enough oxygen to the low-oxygen mixtures to decompose $NH_3$, resulting in a mixture with a suitable $NH_3/NO_x$ ratio. In the thermally functioning selective reduction unit, $NH_3/NO_x$ can be $\gg 1$, but in the catalytic reduction unit, a system with an $NH_3/NO_x$ ratio of slightly less than 1 usually works the best. Thermal applications comprise, e.g., combustion boiler objects, where the units can be located inside the boiler itself, comprising certain combustion spaces in the boiler. In these objects, the selective reduction unit generally works in accordance with the principles of the selective, non-catalytic reduction. The units according to the invention can also be provided after the boiler, whereby the temperatures are suitable for the catalytic units and the excess amounts of ammonia and nitrogen oxides can be removed.

In power plant boilers or gasification plants, powdery or granular catalysts can also be fed to the various stages alone or along with the fuel or other substances that are fed to the plants (desulphurization chemicals, fluidized bed materials, ashes, slag), whereby at suitable points, catalytic materials are fed to the decomposition/oxidation of ammonia, the selective reduction and the removal of laughing gas. The catalytic materials for the decomposition/oxidation of ammonia and the reduction contain, e.g., iron, calcium, magnesium, zirconium, cerium, titanium, aluminium, silicon and/or carbon. As to its conditions, fluidized bed combustion is favourable to be used in the method according to the invention. The temperature is often fairly low, 800 to 900° C., and the feeding of air/fuel takes place in stages, whereby the oxidation of ammonia can take place thermally in the reduction zones, or it can be enhanced by a catalytic material, such as ash or iron compounds (e.g., the slag or ashes from the metal industry). In the subsequent zones, the thermal and catalytic reduction of ammonia and nitrogen oxides as well as the removal of laughing gas can be further utilized. The first and second units can be thermal and the third removal unit of laughing gas can be catalytic.

In gasification, the decomposition/oxidation unit of $NH_3$ can be situated in a pressurized or unpressurized gasification process, and the reduction unit and the laughing gas removal unit can be located outside the gasification plant in a combustion plant or after the same. In the gasification processes, there can also be a separate or integrated catalyst for the purification of hydrocarbon compounds, mainly comprising the same active components as the removal/decomposition catalyst of $NH_3$ according to the invention. In such processes, there can also be a particle filter provided before the combustion plant that generates energy and/or electricity. In the method according to the invention, combinations of thermal and catalytic units can also be used. The method can be used in stationary or moving objects.

The $N_2O$ removal unit can also have selective reducing properties ($NO_x+NH_3 \rightarrow N_2$), SCR properties, and the selective reduction unit can have decomposition properties of $N_2O$, or these properties are integrated into the same units. Such catalysts include, e.g., Fe/zeolite catalysts, which have activity both in the decomposition/reduction of $N_2O$ and in the SCR of nitrogen oxides. Instead of iron, the active component in zeolite can also be another metal that is known to be active in decomposing laughing gas.

The ranges of use of the invention include flue gas and effluent gas applications in objects, where the mixture comprises oxygen in excess amounts. If the original mixture comprises no oxygen at all or not enough oxygen, it can be added to the mixture before the decomposition/oxidation unit of $NH_3$ and before the selective reduction unit. An ammonia reducer or its derivatives or mixtures can also further be fed to the fluid before the selective reduction unit, whereby the $NH_3/NO_x$ ratio can be suitably fine-adjusted before the reduction unit. The effluent gases can also comprise other emissions (ammonia derivatives, hydrocarbons, hydrogen, carbon monoxide, nitrogen oxides), which are removed by the method according to the invention. The other compounds (ammonia derivatives, HCs, carbon monoxide, hydrogen) can also participate in the reduction reactions (nitrogen oxides). In one application, gas (usually air) is conducted through soil or liquids, to which gas ammonia from the soil or air is transferred, and the ammonia can be treated by the method according to the invention. The method can also be applied to liquid mixtures comprising ammonia or ammonium. Accordingly, the fluid can also be liquid-based or a mixture of liquids and gases.

The method can also be applied to other impurities that comprise nitrogen (HCN, HNCO, nitrogen-comprising amides/amines/pyridines, urea or the derivatives thereof, ammonium compounds), which are to be converted into harmless compounds, such as nitrogen. In the by-pass, these compounds can partly be converted catalytically into nitrogen oxides that react with unreacted N compounds and form nitrogen. The effluent gas can also comprise laughing gas before the method is used. The compounds comprising nitrogen can also be in a liquid phase, whereby the ammonium compounds, for example, are partly oxidized/decomposed and the mixture is then conveyed to the reduction unit.

The by-pass according to the invention can be implemented by using similar cell structures both in the oxidation/decomposition unit of $NH_3$ and the by-pass. In that case, the flow is distributed approximately in relation of the cell's face surface area to the by-pass and the catalyst at different temperatures. When using a flow-technical by-pass with a different structure, the temperature dependency of the flow in each flow channel can alter the flow distribution.

The catalyst compositions according to the invention are coated by separately spraying coating slurry on smooth and creased open metal foils or surfaces. After the coating, the catalysts are dried and calcined. Alternatively, the catalyst coatings are coated by dipping or immersing the finished, generally cellular metal or ceramic catalyst structure in the catalyst slurry. In the manufacture, a combination of these manufacturing methods can also be used.

The active metals and promoters have already been added to the slurry or they have been absorbed into the coated catalyst. The coating and the active components can also be added from gaseous or solid starting materials by means of various methods.

The catalyst coating according to the invention can be pre-coated or post-coated on normal ceramic or metallic cells or structures, where the form of the hole (e.g., square, triangle), the cell number (10 to 2000 cpsi, holes/square inch) or the wall thickness (10 to 2000 µm) can vary within a wide range, depending on the application. When the effluent gas comprises large amounts of particles or sulphuric compounds, very large cell sizes can be used in the catalyst (<100 cpsi). In objects comprising a few particles and little sulphur, very small cell sizes can be used (e.g., >500 cpsi) in the cell. These variable values can also vary in the same cell or sequential cells, whereby an advantage is obtained because of effective mixing, a low pressure loss or mechanical strength, among others. The catalyst structures can be implemented using pellet-type, extruded or powdery catalysts. The catalyst can also be fluidized in a desired spot in a fluidized bed combustion boiler, for example.

The cell that is to be coated can also constitute a certain type of a static mixer structure that either comprises mixing zones (e.g., bends, flow barriers or throttlings) in separate channels or the structure is made by installing creased, corrugated foils or plates one top of the other so that the direction of the wave crest deviates from the incoming direction of the gas, and the wave crests of the superimposed plates are divergent. In a conventional metal cell, the wave crests of the creased foil are parallel to each other and the main flow direction. The mixing efficiency can be adjusted by varying the angle between the wave crest and the main flow direction. The mixer structure can also be made by alternately folding an obliquely creased foil in an overlapping manner, whereby the wave crests come against each other and not within each other. The obliquely creased structure can also be rolled up into a round roll. In that case, the angle of the oblique crease is small or the foil is flexible (e.g., from a mesh or perforated). The mixer structure provides mixing of the flow in the radial direction of the pipe. The mixer structure also provides higher collection efficiencies for the particles than the conventional cell structure. The shapes of the catalysts and the flow channels can be round, elliptical, square, angular, or combinations thereof. Around or inside the reactor, there can be insulation material and/or heat exchange structures/devices. The structure that is to be coated can also partly of fully comprise a wire mesh, sintered porous metal, fibre, or a particle trap.

The catalyst according to the invention can also be coated on two or more of the above-mentioned catalyst structures that are sequential or parallel in the flow direction. The catalyst structures with the same or different sizes can be situated in the same catalyst converter or they can be in separate converters, whereby there is a sufficient amount of pipework between the same. The compositions of the catalysts according to the invention, the noble metal charges (such as Pt), the cell numbers (geometrical surface areas) or structures can be mutually similar or different.

The decomposition/oxidation catalyst of $NH_3$ comprises noble metals (Pt, Pd, Rh, Ru, Ag, Ir, Au) or base metals (Sc, Y, Zr, V, Mn, Cr, Fe, Ni, Co, Zn, Ge, Ga, In, Sn, Ce) or the mixtures or mixed oxides thereof as catalytically active materials. The surface area and the durability of the catalyst can be improved by dispersing the active components alone or as combinations, for example, on the surface of zeolite, aluminium oxide, titanium oxide, silicon dioxide, zirconium oxide, metal silicate, or the combinations or mixed oxides thereof (the support material). Any of the above-mentioned active metals can also function as support material, on the surface of which the other components are added. The active components can form mixed oxides with each other or the support material. In the decomposition/oxidation unit of $NH_3$, efforts can be made to minimize the formation of laughing gas and try to use other than Pt-bearing catalysts, for example. Using Ru, Pd, or PtPd catalysts, the formation of laughing gas can be decreased considerably. Thus, this catalyst works as the removal catalyst of $NH_3$ and the reactions can comprise the oxidation of ammonia into nitrogen oxides (NO, $NO_2$), SCR reactions ($NO_x/NO_2/N_2O+NH_3+O_2 \rightarrow N_2$, $N_2O+H_2O$) or a direct decomposition of $NH_3$ ($NH_3(+O_2) \rightarrow N_2, N_2O$). The $N_2$ that is formed improves the functioning of many SCR catalysts through "a quick SCR reaction", whereby the activity in the subsequent reduction unit is enhanced. Reducing properties can also be integrated into the decomposition/oxidation catalyst of $NH_3$, whereby the catalyst comprises V or zeolite-based support materials together with the active metals mentioned above, for example. The catalyst may then comprise, for example, noble metals in a V-W/$TiO_2$ catalyst.

The selective reduction catalyst contains, as catalytically active material, base metals (Zr, V, Mn, Cr, Fe, Ni, Cu, Co, Ce, W, Hf, Nb, Mo) or the mixtures/mixed oxides thereof. In addition, there can also be noble metals. The surfape area and the durability of the catalyst can be improved by dispersing the active components alone or in combinations, for example, on the surface of aluminium oxide, aluminium silicates (such as zeolites), titanium oxide, silicon dioxide, zirconium oxide, silicon oxide, or the mixtures or mixed oxides thereof (the support material). As zeolites, ZSM-5, Beta, Y, mordenite, ferrierite, TS-1 or corresponding zeolites can be used. The Si/$Al_2$ ratio of these zeolites is within 10 and 500, preferably within 20 and 60. The active components can form mixed oxides with each other or the support material.

The catalytically active materials in the removal unit of laughing gas ($N_2O$) comprise noble metals (Pt, Pd, Rh, Ru, Ag, Ir, Au, preferably Pt, Pd or Ru) or base metals (Y, Zr, Mn, Cr, Fe, Ni, Co) or the mixtures or mixed oxides thereof. The surface area and the durability of the catalyst can be improved by dispersing the active components alone or in combinations, for example, on the surface of aluminium oxide, aluminium silicates (such as zeolites), titanium oxide, silicon dioxide, zirconium oxide, silicon oxide, or the mixtures thereof (the support material). As zeolites, ZSM-5, Beta, Y, mordenite, ferrierite, TS-1 or corresponding zeolites or their mixtures can be used. The Si/$Al_2$ ratio of these zeolites is within 10 and 500, preferably within 20 and 60. The active components can form mixed oxides with each other or the support material. Typical removal catalysts of laughing gas comprise FE/zeolites (Fe/Beta, Fe/ZSM-5, Fe/Ferrierite) or other Fe, Ni, or Ru-bearing catalysts on the surface of the oxides or zeolites mentioned above.

The selective catalytic reduction units and the removal units of laughing gas can partly be located in the same catalytic structure and comprise the same catalytic materials. In the catalytic unit, the materials that catalyze these reactions can be mixed together in the same catalyst bed or they can be separated from one another in different coating layers or different parts of the supporting structure. When making an integrated catalyst of metal foil, a selective reduction catalyst can be coated on one foil, and the removal catalyst of laughing gas on the other. In that case, the flow channel comprises, in the axial direction thereof, the removal catalyst of nitrogen oxides/ammonia on one wall and the removal catalyst of laughing gas on the other wall. For example, there can be a VW/Ti-based catalyst on one wall and Fe/zeolite (such as Fe/Beta, Fe/ZSM-5) on the other.

The reduction catalyst of laughing gas can also be integrated into the oxidation/decomposition catalyst of $NH_3$. All three units can also be integrated together, whereby the catalyst oxidizes part of the ammonia into nitrogen oxides, and functions as a selective reduction catalyst ($NH_3+NO \rightarrow N_2$) and the removal catalyst of laughing gas ($N_2O \rightarrow N_2$ or $N_2O+NH_3 \rightarrow N_2$). The removal of laughing gas can take place by decomposition or reduction by means of ammonia or other reducing agent that is in the fluid or has been added thereto. The decomposition unit of laughing gas can also be placed before the reduction unit in the direction of flow, whereby laughing gas is removed before the reduction unit.

The appended examples describe some applications of the invention.

The preparation of the Catalysts Described in the Examples:

Slurry was prepared from raw coating materials, whereto active ingredients and binders were added with a purpose of ensuring the adhesion and the cohesion on the surface of the supporting structure. As binders, Si or Al sols were used for the SCR catalysts and Al sol for the decomposition/oxidation catalyst of $NH_3$. The prepared slurry was used to coat 50-μm thick smooth and creased metal foils; the samples were dried at about 110° C. and calcined for 4 hours at 550° C. Desired amounts of Pt, Pd, Ru and V were absorbed into the catalyst using Pt ammin carbonate, Pd nitrate, Ru solutions or ammonium vanadate solutions as starting materials. In that case, the active components are dispersed into small particles on the surface of the catalyst. After the absorption, the catalyst was dried at about 80 to 300° C. and calcined in the air. A cellular sample was provided by rolling together the smooth and the creased coated foils. The specific surface area of the active support material on the various samples was about 50 to 300 $m^2$/g after the preparation. The amount of support material on the surface of the metal foil was about 40 to 60 $m^2$/g. In the Pt/Al—Ti—Si catalyst, (No. 1), a Pt-free, thin surface layer was used, whereby, in the oxidation reaction, the entry of active Pt (or other noble metal) to the subsequent reduction unit is prevented. The decomposition/oxidation catalyst can thus be coated by an inert support material, which when detaching and drifting forward, does not affect the activity of the subsequent reduction catalyst. For example, the composition can have the same or corresponding activity as the reduction catalyst does.

TABLE 1

Cell catalysts used in activity tests.

| No. | Catalyst code | Support material g/$m^2$ | Active component % in the support material | Cell number cpsi |
|---|---|---|---|---|
| 1 | Pt/Al—Ti—Si | 42 + 8 | 1.2 + 0 Pt | 400 |
| 2 | Pt/Al—Ce—Zr | 50 | 0.9 Pt | 300 |

TABLE 1-continued

Cell catalysts used in activity tests.

| No. | Catalyst code | Support material g/m² | Active component % in the support material | Cell number cpsi |
|---|---|---|---|---|
| 3 | 1.1Pt/Al—Ce—Zr-ZSM5-Beta | 40 | 1.1 Pt | 500 |
| 4 | Pt/Al—Ce—Zr-ZSM5-Beta | 50 | 1.4 Pt | 400 |
| 5 | 0.4Pt/Al—Ce—Zr-ZSM-5-Beta | 50 | 0.4 Pt | 400 |
| 6 | Ru/Al—42Ce | 40 | 0.3 Ru | 500 |
| 7 | Ru/Al—28Ce | 40 | 0.3 Ru | 500 |
| 8 | PtPd/Al—Ce—Zr | 42 | 1.1 PtPd (1:1) | 500 |
| 9 | Pd/Al—Ce—Zr | 49 | 1.0 Pd | 400 |
| 10 | Rh/Al—Ce—Zr | 61 | 0.8 Rh | 300 |
| 11 | V—W/Ti—Si | 50 | 2.4 $V_2O_5$ | 600 |
| 12 | Fe/Beta-Al | 34 | ~1 Fe | 600 |
| 13 | Fe/ZSM-5-Al | 34 | ~1 Fe | 600 |

Cpsi = cells per square inch.

The activity of the catalysts was tested in laboratory conditions, which simulated effluent gases that contained ammonia and air. The composition of the inlet of the laboratory reactor was adjusted by computer-controlled mass flow regulators, and the composition was analyzed by continuous FTIR analyzers, enabling the separation of various nitrogen oxides (NO, $NO_2$, $N_2O$) and the ammonia from each other. The conditions in the activity measurements carried out by the laboratory equipment were as follows:

TABLE 2

Gas compositions used in the laboratory simulation.

| Compound | Mix 1 | Mixture 2 |
|---|---|---|
| $NH_3$, ppm | 80 | 1000 |
| $O_2$, % | 21.8 | 21.8 |
| $N_2$ | the rest | the rest |
| Space velocity $h^{-1}$ | 50.000 | ~25.000-50 000 over the various units |

Space velocity (SV) = the rate of flow of exhaust gas/the volume of catalyst cell
Conversions in the empty reactor were insignificantly low.

Example 1

A problem with the noble metal catalysts is their poor selectivity, even though it is possible to remove all of the ammonia at over 250° C. (FIGS. 5 and 6). Instead of nitrogen, too much laughing gas, NO, and $NO_2$ were generated. It was possible to decrease the formation of laughing gas by using the Ru catalyst (15% of $NO_2$ at the maximum) instead of the Pt catalyst (30% of $N_2O$ at the maximum), but the selectivity into nitrogen was too low, when using exclusively such well-known decomposition or removal catalysts of ammonia.

Example 2

The typical SCR catalysts that are used for the removal of nitrogen oxides can also be used for the removal of ammonia in lean conditions (excess amounts of oxygen with respect to the oxidation of ammonia) (FIGS. 7 and 8). The SCR and $NH_3$ oxidation activities of the SCR catalyst change as a function of temperature, when feeding ammonia alone, whereby a temperature window is found, where the conversion into nitrogen was 69% with the V—W/Ti—Si catalyst at 350° C. (80 ppm $NH_3$) and 87% with the Fe/Beta catalyst at 500° C. Accordingly, in the SCR catalyst, a partial oxidation of $NH_3$ into $NO_x$ ($NO/NO_2$) and an SCR reaction ($NO_x$+$NH_3$+$O_2$→$N_2$) are combined in the application used. With the Fe/Beta catalyst, the formation of laughing gas remained low. With the V catalyst, the formation of $NO_x$ was low, but too much laughing gas was generated.

Example 3

By combining the V—W/Ti—Si catalyst and the Fe/Beta catalyst sequentially, the conversion into nitrogen was enhanced and the amounts of both laughing gas and $NO_x$ remained low (FIG. 9). The conversion into nitrogen was as much as 96% at 500° C., whereby all of the ammonia had been removed and there was 1% of laughing gas, the rest being No and $NO_2$. By this combination, the selectivities are acceptably high, and this combination is also well-suited to the reverse flow reactors, as the catalysts are the same in both flow directions. In this concept, the oxidation/decomposition and the reduction catalysts of $NH_3$ and the removal catalysts of laughing gas are integrated.

Example 4

By combining the decomposition/oxidation/removal catalyst of $NH_3$ (Pt or Ru catalysts) and the SCR catalyst (V—W/Ti—Si) in series, it was possible to change the operational window and increase the conversions into nitrogen, but the undesired conversions into nitrogen oxides remained fairly high (FIGS. 10 and 11). By this combination, the best selectivity into nitrogen is found at low temperatures (<250° C.). A problem with high temperatures is the great formation of $NO_x$. Accordingly, the oxidation/decomposition catalyst could be used to decrease the operating temperature.

Example 5

As the direct combination of the $NH_3$ decomposition/oxidation catalyst and the SCR catalyst did not yield a desired result but an excess amount of NO was generated, the oxidation of $NH_3$ in the first unit was adjusted by means of a by-pass, where $NH_3$ should not oxidize at all. In this way, the idea was to obtain in the inlet of the SCR catalyst a mixture of $NH_3$:$NO_x$=1, which would react in the SCR reaction. At first, the portion of by-pass was 50%, whereby the conversion into nitrogen at a high temperature improved, but a lot of NO was still generated (FIGS. 12 and 13). In practice, the operating temperature in this system can be such that the ammonia is fully removed, but not too much NO is yet generated. In that case, conversions of 50% into nitrogen are obtained, Pt/Al—Ti—Si being in the by-pass in the first unit, and conversions of 75% into nitrogen, Ru/Al-42Ce being in the by-pass in the first unit. The SCR catalyst was V—W/Ti—Si.

Example 6

The catalyst combination was tested with a 65% by-pass, using various decomposition/oxidation catalysts of $NH_3$ together with the VW/Ti—Si catalyst (FIGS. 14 to 16). Using Pd or Rh catalysts for the oxidation/decomposition of $NH_3$, it was possible to increase the formation of nitrogen to a level of 72 to 75%, the formation of laughing gas remaining below 20%. By replacing the VW/Ti—Si catalyst with the Fe/Beta or V—W/Ti—Si+Fe/Beta catalysts, the formation of $N_2$ increased to 86% and the formation of laughing gas was below 10% (FIG. 16). The Fe/Beta catalyst worked in the combination as the removal catalyst of laughing gas and also as the selective reduction catalyst.

Example 7

By further increasing the portion of by-pass to 86% by means of the Pt catalyst, the formation of $NO_2$ increased to 65%, but a rather large amount of laughing gas is formed by this combination with various Pt contents (FIGS. 17 and 18). With the Pt catalyst, $NH_3$ can be removed at low temperatures (>99% 300° C.), but the formation of laughing gas presents a problem. By using the PtPd catalyst with the same by-pass and reduction catalyst, the formation of $NO_2$ increased and the formation of laughing gas decreased (FIG. 19).

Example 8

By adding the Fe/Beta catalyst before and after the VW/Ti—Si catalyst, while the Pt catalyst was bypassed, the formation of $N_2$ increased to over 70% and it was possible to remove almost all of the laughing gas at over 450° C. (FIG. 20).

Example 9

By replacing the Pt catalyst of the previous example with a PtPd catalyst with the same by-pass, the formation of $N_2$ could be increased to 84% and the amount of laughing gas at 400° C. was 11%, disappearing completely within 450 and 500° C. (FIG. 21).

Example 10

As laughing gas is formed in the decomposition/oxidation catalyst of $NH_3$ even with large by-passes, the portion of gas going through the catalyst was further decreased (FIG. 22). By using a 98% by-pass with the PtPd catalyst and, thereafter, combinations of Fe/Beta+VW/Ti—Si+Fe/Beta, a level of about 94 to 97% of the formation of $N_2$ was reached, the amount of laughing gas in the products remaining below 2%. This combination works on the desired level, converting all of the ammonia and forming nitrogen with a conversion of >95%, the amounts of laughing gas, NO, and $NO_2$ remaining below 2% in the product gas. By using the PtPd catalyst, the amount of laughing gas thus generated can be decreased. It is possible to even use higher Pt/Pd ratios, whereby the amount of laughing gas thus generated further decreases. In the same way, it is possible to use other metals with Pt.

Example 11

By using a Pt catalyst provided with by-passes on both sides of the Fe/ZSM-5 catalyst (integrated selective reduction and removal of laughing gas), it was possible to decrease the formation of laughing gas to below 2% at over 450° C. (FIG. 23). This is an example of the use of Fe/ZSM-5, the integration of the units, and the use of by-pass on both sides of the reduction units and the removal units of laughing gas. In the same way, it would be possible to use the PtPd catalyst in place of the Pt catalyst, and the Fe/Beta catalyst in place of the Fe/ZSM-5, and to use a larger by-pass. The by-passes on both sides also simulate the activity in the reverse flow reactor.

The invention claimed is:

1. A method of removing ammonia ($NH_3$) from a fluid containing oxygen, the method comprising:
   conveying a first portion of the fluid to a decomposition/oxidation unit and conveying a second portion of the fluid to a by-pass unit;
   treating the first portion of the fluid in the decomposition/oxidation unit to oxidize the ammonia into nitrogen oxides ($NO_x$);
   mixing the treated and oxidized first portion of the fluid with the second portion of the fluid that was conveyed to the by-pass unit, in a mixing unit to form a fluid mixture comprising the $NO_x$ and $NH_3$;
   conveying the fluid mixture to a selective reduction unit, wherein the $NO_x$ and the $NH_3$ react to form $N_2$.

2. The method according to claim 1, further comprising conveying the fluid mixture to at least one removal unit and removing nitrous oxide ($N_2O$) from the fluid mixture.

3. The method according to claim 2, wherein at least one of the decomposition/oxidation unit, selective reduction unit and removal unit has a surface coating of cellular structures arranged in parallel, divergent or winding flow channels, the structures comprising ceramic, metallic or catalytic material and configured to function catalytically.

4. The method according to claim 2, wherein the selective reduction unit and the removal unit are integrated in a same unit.

5. The method according to claim 1, wherein the fluid mixture in the mixing unit has a $NH_3/NO_x$ ratio in a range of 0.1 to 10.

6. The method according to claim 1, wherein the fluid mixture in the mixing unit has a $NH_3/NO_x$ ratio in a range of 0.8 to 1.6.

7. The method according to claim 2, further comprising adding a reducing agent to at least one of the fluid and the fluid mixture.

8. The method according to claim 7, wherein the reducing agent comprises ammonia, ammonia derivatives, hydrocarbons, hydrocarbon derivatives, or a mixture thereof.

9. The method according to claim 2, wherein the decomposition/reduction unit, the selective reduction unit and the removal unit are integrated in a same unit.

10. The method according to claim 1, wherein the decomposition/reduction unit includes a catalyst comprising Pt, Pd, Ru, Rh, or any combination thereof.

11. The method according to claim 1, wherein the second portion of the fluid conveyed to the by-pass unit is greater than 70% by volume of the total fluid.

12. The method according to claim 2, wherein the selective reduction unit and the at least one removal unit include a catalyst comprising vanadine, tungsten, copper, iron, or any combination thereof.

13. The method according to claim 2, wherein the decomposition/reduction unit, the selective reduction unit and the at least one removal unit comprise a catalyst carrier comprising: zeolite, silicon dioxide, aluminum dioxide, titanium dioxide or any combination thereof.

14. The method according to claim 1, wherein the fluid is an exhaust, flue or waste fluid.

15. An apparatus for removing ammonia from exhaust, flue or waste fluids that contain oxygen, the apparatus comprising:
- a decomposition/oxidation unit for decomposing and oxidizing the ammonia ($NH_3$) contained in the fluid into nitrogen oxides ($NO_x$);
- a by-pass unit for conveying the fluid and by-passing the fluid past the decomposition/oxidation unit;
- a mixing unit for mixing decomposed and oxidized fluid from the decomposition/oxidation unit and fluid conveyed from the by-pass unit to form a fluid mixture comprising the $NO_x$ and $NH_3$; and
- a reduction unit for selectively reducing the fluid mixture and reacting the $NO_x$ and $NH_3$ to form $N_2$.

16. The apparatus according to claim 15, wherein the decomposition/oxidation unit includes a catalyst comprising:
- a carrier, and
- a metal selected from the group consisting of: Pt, Pd, Rh, Ru, Ag, Ir, Au, Sc, Y, Zr, V, Mn, Cr, Fe, Ni, Co, Zn, Ge, Ga, In, Sn, Ce, oxides of said metals, and any combination thereof, on a surface of the carrier.

17. The apparatus according to claim 15, wherein the reduction unit includes a catalyst comprising:
- a carrier, and
- a metal selected from the group consisting of: Zr, V, Mn, Cr, Fe, Ni, Cu, Co, Ce, W, Hb, Nb, Mo, oxides of said metals, and any combination thereof, on the surface of the carrier.

18. The apparatus according to claim 15, further comprising a removal unit for removing nitrous oxide ($N_2O$) from the fluid mixture.

19. The apparatus according to claim 18, wherein the removal unit includes a catalyst comprising:
- a carrier, and
- a metal selected from the group consisting of: Pt, Pd, Rh, Ru, Ag, Ir, Au, Y, Zr, Mn, Cr, Fe, Ni, Co, oxides of said metals, and any combination thereof, on a surface of the carrier.

20. The apparatus according to claim 16, wherein the metal is selected from the group consisting of: Pt, Pd, Rh, Ru, and any combination thereof.

21. The apparatus according to claim 20, configured to convey more than 70% by volume of the total fluid to the by-pass unit.

22. The apparatus according to claim 18, wherein at least one of the decomposition/oxidation unit, reduction unit and removal unit includes a catalyst carrier comprising aluminum oxide, aluminum silicate, zeolite, titanium oxide, silicon dioxide, zirconium oxide, silicon oxide, or any combination thereof.

23. The apparatus according to claim 22, wherein the catalyst carrier comprises zeolite selected from the group consisting of: ZSM-5, ZSM-22, Beta, Y, mordenite, ferrierite, TS-1, and any combination thereof.

* * * * *